United States Patent [19]

Nagaoka

[11] Patent Number: 4,504,876
[45] Date of Patent: Mar. 12, 1985

[54] MINIATURE TYPE TAPE CASSETTE

[75] Inventor: Yoshimichi Nagaoka, Yokohama, Japan

[73] Assignee: Victor Company of Japan, Ltd., Yokohama, Japan

[21] Appl. No.: 392,157

[22] Filed: Jun. 25, 1982

[30] Foreign Application Priority Data

Jun. 30, 1981 [JP] Japan ............................ 56-97116[U]

[51] Int. Cl.³ ................... G11B 5/008; G11B 15/48; G11B 15/32; G03B 1/04
[52] U.S. Cl. .................... 360/94; 360/74.6; 242/198
[58] Field of Search ............ 360/94, 90, 91, 92, 360/93, 96, 74.1, 74.5, 74.6; 242/198, 199, 200

[56] References Cited

U.S. PATENT DOCUMENTS

| | | | |
|---|---|---|---|
| 3,800,321 | 3/1974 | Bolick | 360/94 |
| 3,900,170 | 8/1975 | Serizawa | 242/198 |
| 4,091,426 | 5/1978 | Umeda | 360/74.6 |
| 4,138,698 | 2/1979 | Kokei | 360/74.6 |
| 4,185,307 | 1/1980 | Sato | 360/94 |
| 4,206,487 | 6/1980 | Sato | 360/94 |

FOREIGN PATENT DOCUMENTS 1312282  4/1973  United Kingdom .

Primary Examiner—Robert M. Kilgore
Attorney, Agent, or Firm—Louis Bernat

[57] ABSTRACT

A miniature type tape cassette comprises a cassette case smaller than a standard type tape cassette, a magnetic tape, a transparent leader tape having one end secured to a take-up reel and the other end connected to a starting end of the magnetic tape, and a transparent trailer tape having one end secured to a supply reel and the other end connected to a terminal end of the magnetic tape, which are accommodated within the cassette case. The miniature type tape cassette is loaded together with a tape cassette adapter having an external form and size identical to the standard type tape cassette into a standard type recording and/or reproducing apparatus, and is also loaded independently into a compact type recording and/or reproducing apparatus of a type different from the standard type recording and/or reproducing apparatus. An optical tape end detector provided in the standard type recording and/or reproducing apparatus detects the tape ends at two detecting positions, where a first tape length between the supply reel and one detecting position is different from a second tape length between the take-up reel and the other detecting position. The transparent leader tape and the transparent trailer tape have mutually different lengths respectively longer than the first and second tape lengths so that the optical tape end detector can perform the detection, in a state where the miniature type tape cassette is accommodated within the tape cassette adapter and loaded into the standard type recording and reproducing apparatus together with the tape cassette adapter. The difference in lengths between the transparent leader tape and the transparent trailer tape corresponds to the difference between the first and second tape lengths.

4 Claims, 10 Drawing Figures

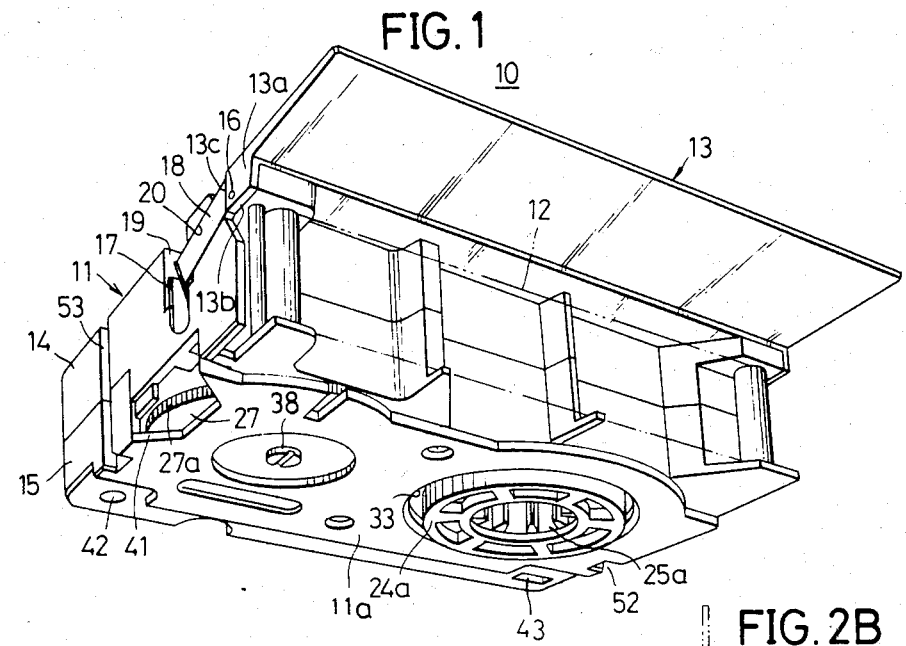
FIG. 1
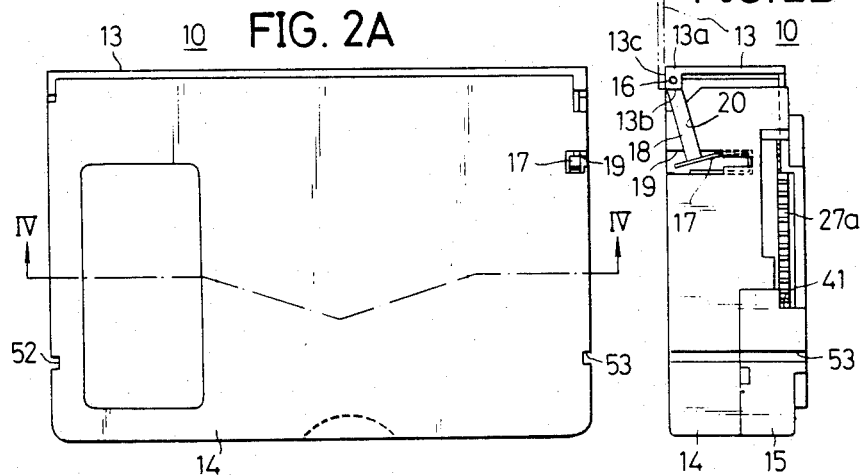
FIG. 2A
FIG. 2B
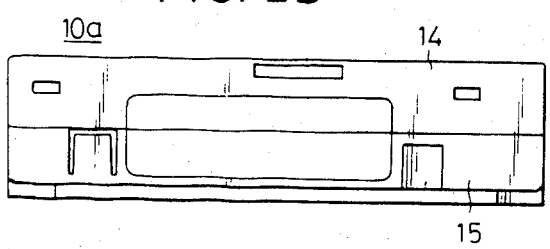
FIG. 2D

MINIATURE TYPE TAPE CASSETTE

BACKGROUND OF THE INVENTION

The present invention generally relates to miniature type tape cassettes, and more particularly to a miniature type tape cassette which is loaded in a state accommodated within a tape cassette adapter having the same external form and size as a standard type tape cassette with respect to a standard type recording and/or reproducing apparatus which performs recording and/or reproduction when loaded with a standard type tape cassette, and loaded independently with respect to a compact type recording and/or reproducing apparatus of a type different from the standard type recording and/or reproducing apparatus. The present invention specifically relates to a miniature type tape cassette comprising a transparent leader tape and a transparent trailer tape, in which lengths of the leader and trailer tapes are independently determined so that the leader and trailer tapes are drawn out to positions where detection can be made by optical tape end detection means of the standard type recording and/or reproducing apparatus, and so that the leader and trailer tapes are drawn out to an extent so as not to make contact with a guide drum of the compact type recording and/or reproducing apparatus.

Recently, a problem of much importance involves the realization in reducing the size of the recording and/or reproducing apparatus main body. This is to realize a more compact portable type recording and/or reproducing apparatus, and, for example, to realize such an equipment in which a recording apparatus is unitarily built into a television camera. In realizing the size reduction of the recording and/or reproducing apparatus main body, it is desirable to satisfy the following conditions. That is, interchangeability must exist so that a tape cassette recorded by the compact type recording and/or reproducing apparatus can be reproduced by the standard type recording and/or reproducing apparatus, and the size of the tape cassette must be small.

In order to satisfy the above conditions, tape cassettes were proposed in U.S. patent applications Ser. No. 322,174 filed on Nov. 17, 1981, Ser. No. 339,671 filed on Jan. 15, 1982, and Ser. No. 339,675 filed on Jan. 15, 1982, respectively entitled TAPE CASSETTE, in which the assignee is the same as that of the present application. The proposed tape cassette comprises a cassette case smaller than the standard type tape cassette, and a tape accommodated within the cassette case. With respect to the standard type recording and/or reproducing apparatus which performs recording and/or reproduction when loaded with the standard tape cassette, the proposed tape cassette is loaded thereto together with a tape cassette adapter having an external form and size identical to the standard type tape cassette, in a state where the proposed tape cassette is accommodated within the tape cassette adapter and the tape is drawn out of the cassette case to form a predetermined tape path. The proposed tape cassette is loaded independently with respect to a compact type recording and/or reproducing apparatus of a type different from the standard type recording and/or reproducing apparatus. Such a tape cassette proposed, is being reduced to practice.

In the above described previously proposed tape cassette, it is desirable for the conditions such as the following to be satisfied. That is, (a) when the tape cassette is used in a state accommodated within the tape cassette adapter, it must be possible for optical tape end detection means of the standard type recording and/or reproducing apparatus to operate and detect the tape end, (b) when the tape cassette is used with respect to the compact type recording and/or reproducing apparatus, joints between the leader tape and the magnetic tape, and the trailer tape and the magnetic tape, must not make contact with the drum (the video heads will be damaged if the step part at the joint makes contact with the drum), and (c) because the cassette case is small and the quantity of magnetic tape that can be wound and accommodated within the tape cassette is accordingly limited, the tape cassette must accommodate as much magnetic tape as possible.

SUMMARY OF THE INVENTION

Accordingly, it is a general object of the present invention to provide a novel and useful miniature type tape cassette in which the above described demands have been satisfied.

Another and more specific object of the present invention to provide a miniature type tape cassette in which the lengths of a leader tape and a trailer tape are set to different lengths so that the leader and trailer tapes are drawn out to positions where detection can be made by optical tape end detection means of the standard type recording and/or reproducing apparatus when the miniature type tape cassette is used in a state accommodated within a tape cassette adapter, and so that the leader and trailer tapes are drawn out to an extent so as not to make contact with a guide drum of the compact type recording and/or reproducing apparatus. According to the miniature type tape cassette of the present invention, video heads are prevented from being damaged by joints between the leader tape and the magnetic tape, and the trailer tape and the magnetic tape. In addition, the leader and trailer tapes can be detected positively by the tape end detection means, and it becomes possible to increase the quantity of magnetic tape which can be wound and accommodated within the tape cassette.

Other objects and further features of the present invention will be apparent from the following detailed description when read in conjunction with the accompanying drawings.

BRIEF DESCRIPTION OF THE DRAWINGS

FIG. 1 is a perspective view showing a miniature type tape cassette according to the present invention in a state where a tape protecting lid is open, viewed from a lower direction with respect to the front of the tape cassette;

FIGS. 2A, 2B, 2C, and 2D are diagrams respectively showing a plan view, a side view, a bottom view, and a rear view of the tape cassette shown in FIG. 1;

DETAILED DESCRIPTION

Figure 2C:
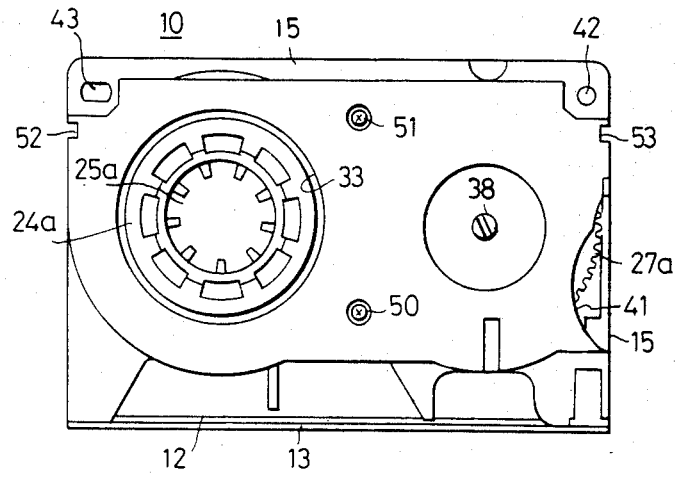

A miniature type tape cassette 10 according to the present invention has a configuration shown in FIGS. 1, 2A through 2D, 3, and 4. The tape cassette 10 has a cassette case 11 of a size smaller than a standard type tape cassette which is loaded into a standard type recording and/or reproducing apparatus. A lid 13 for protecting a magnetic tape 12 accommodated within the tape cassette 10, is provided on the front of the cassette case 11. The cassette 11 consists of an upper half 14 and a lower half 15.

A part of a rectangular-shaped side flange part 13a of the lid 13 is axially supported by a hinge pin 16 at a part in the vicinity of a corner part of the upper half 14, so that the lid 13 is rotatable to open and close. A substantially U-shaped leaf spring 17 and a slide rod 18 which is urged in the direction of the hinge pin 16 by the leaf spring 17, are provided in relation to the above lid 13. The lid 13 can assume two states. That is, in one state, one side edge 13b of the flange part 13a is pushed by the slide rod 18, and the lid 13 is in a closed state shown in FIG. 2B. Further, in another state, another side edge 13c of the flange part 13a is pushed by the slide rod 18, and the lid 13 is an open state shown in FIG. 1 and as indicated by a two-dot chain line in FIG. 2B. The U-shaped leaf spring 17 is fitted into a side groove 19 of the upper half 14. The slide rod 18 is provided within a groove 20 at the side of the upper half 14, in a freely slidable manner. Moreover, when the tape cassette 10 is not loaded into a recording and/or reproducing apparatus designed exclusively for the tape cassette 10 or accommodated within a tape cassette adapter (description with respect to the recording and/or reproducing apparatus designed exclusively for the tape cassette 10 and the tape cassette adapter will be given afterwards), the lid 13 covers the front of the cassette case 11 to protect the magnetic tape 12 which is exposed at the front of the cassette case 11.

Figure 3:
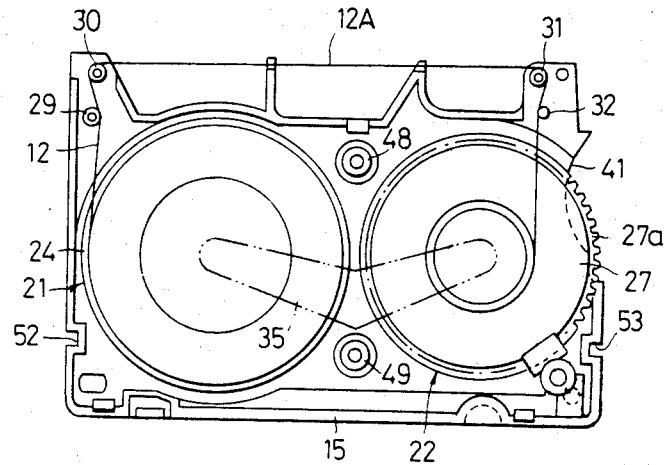
FIG. 3 is a plan view showing the inner construction of the tape cassette shown in FIG. 1 in a state where an upper half of a cassette case and an upper flange of a reel are removed.
Figure 4:
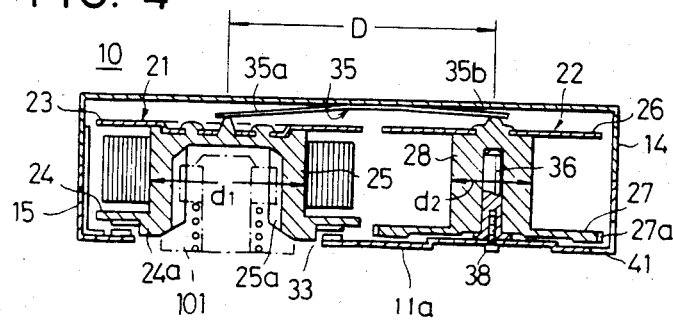
FIG. 4 is a diagram showing a cross section along a line IV—IV in FIG. 2A.

In addition, as shown in FIGS. 3 and 4, a supply reel 21 and a take-up reel 22 are provided side by side within the cassette case 11. A distance D between centers of the reels 21 and 22 is shorter than the distance between centers of supply and take-up reels of a standard type tape cassette used with respect to a standard type recording and/or reproducing apparatus. With respect to the supply reel 21, the magnetic tape 12 is wound around a reel hub 25 between upper and lower flanges 23 and 24. Similarly, the magnetic tape 12 is wound around a reel hub 28 between uper and lower flanges 26 and 27, with respect to the take-up reel 22. The magnetic tape 12 is unwound from the supply reel 21 and guided by guide poles 29, 30, 31, and 32 provided at left and right end sides, along the front side of the cassette case 11, to form a tape path 12A reaching the take-up reel 22.

The supply reel 21 is provided in a state where an annular projecting step portion 24a of the lower flange 24 is loosely fitted into a hole 33 having a large diameter of the lower half 15.

The take-up reel 22 is provided in a rotatable manner such that a fixed shaft 36 fixed at the lower half 15 by a screw 38 is inserted into a center hole of the reel hub 28. The above take-up reel 22 is urged towards the lower half 15 by being pushed downwards by an arm portion 35b of a leaf spring 35. Since the reel hub 28 is not inserted with a reel driving shaft, an outer diameter d2 of the reel hub 28 is smaller than an outer diameter d1 of the reel hub 25 of the supply reel 21. Accordingly, the amount of magnetic tape 12 which can be accommodated within the tape cassette 10 becomes large as compared to the case where the outer diameters d1 and d2 of the reel hubs 25 and 28 are the same. Therefore, although the size of the tape cassette 10 is small, recording and reproduction can be performed for a relatively long period of time by use of the above tape cassette 10.

In addition, gear teeth 27a are formed on the entire outer peripheral part of the lower flange 27 of the take-up reel 22. As shown in FIGS. 1, 2B, 2C, 3, and 4, a part of the outer peripheral part of the lower flange 27 is exposed through a cutout window 41 which extends from the side to the bottom of the lower half 15. The above cutout window 41 is of an arcuate shape on the bottom of the lower half 15.

The upper and lower halves 14 and 15 are fixed together by screws 50 and 51 in a state where the upper half 14 is positioned with respect to the lower half 15 by fitting projections 48 and 49 of the lower half 15 into corresponding depressions (not shown) of the upper half 14.

Grooves 52 and 53 extending in the direction of the height of the tape cassette 10, are respectively formed at positions closer to the rear side of the tape cassette, on the left and right sides of the tape cassette 10.

Next, description will be given with respect to the manipulation and operation involved in a case where the above described tape cassette 10 loaded to the standard type recording and/or reproducing apparatus together with a tape cassette adapter 60, by referring to FIG. 5.

In this case, the tape cassette 10 is accommodated within the tape cassette adapter 60 as will be described hereinafter, to form the above described predetermined tape path within the tape cassette adapter 60. This tape cassette adapter 60 accommodating the tape cassette 10 is loaded into the standard type recording and/or reproducing apparatus as in the case where the standard type tape cassette is loaded.

In order to accommodate the tape cassette 10 within the tape cassette adapter 60, the lid 13 of the tape cassette 10 is first opened as shown in FIG. 1. Then, the magnetic tape 12 is drawn out from the tape cassette 10 by a predetermined length. In this state, the tape cassette 10 is accommodated within an accommodating part 61 of the tape cassette adapter 60, and the magnetic tape 12 which is drawn out is threaded around guide poles 93 and 94 so as to be guided by these guide poles 93 and 94 as shown by a dotted line in FIG. 10. Accordingly, the magnetic tape 12 is guided by these guide poles 93 and 94, and forms a tape path 12B traversing the front surfaces of cutouts 90, 91, and 92, as in the case of the standard type tape cassette.

The teeth 27a of the lower flange 27 which is exposed through the cutout window 41 at the take-up reel 22, mesh with the teeth of an intermediate gear 80 provided within the tape cassette adapter 60 when the tape cassette 10 is lowered, upon loading of the tape cassette adapter 60.

Figure 5:
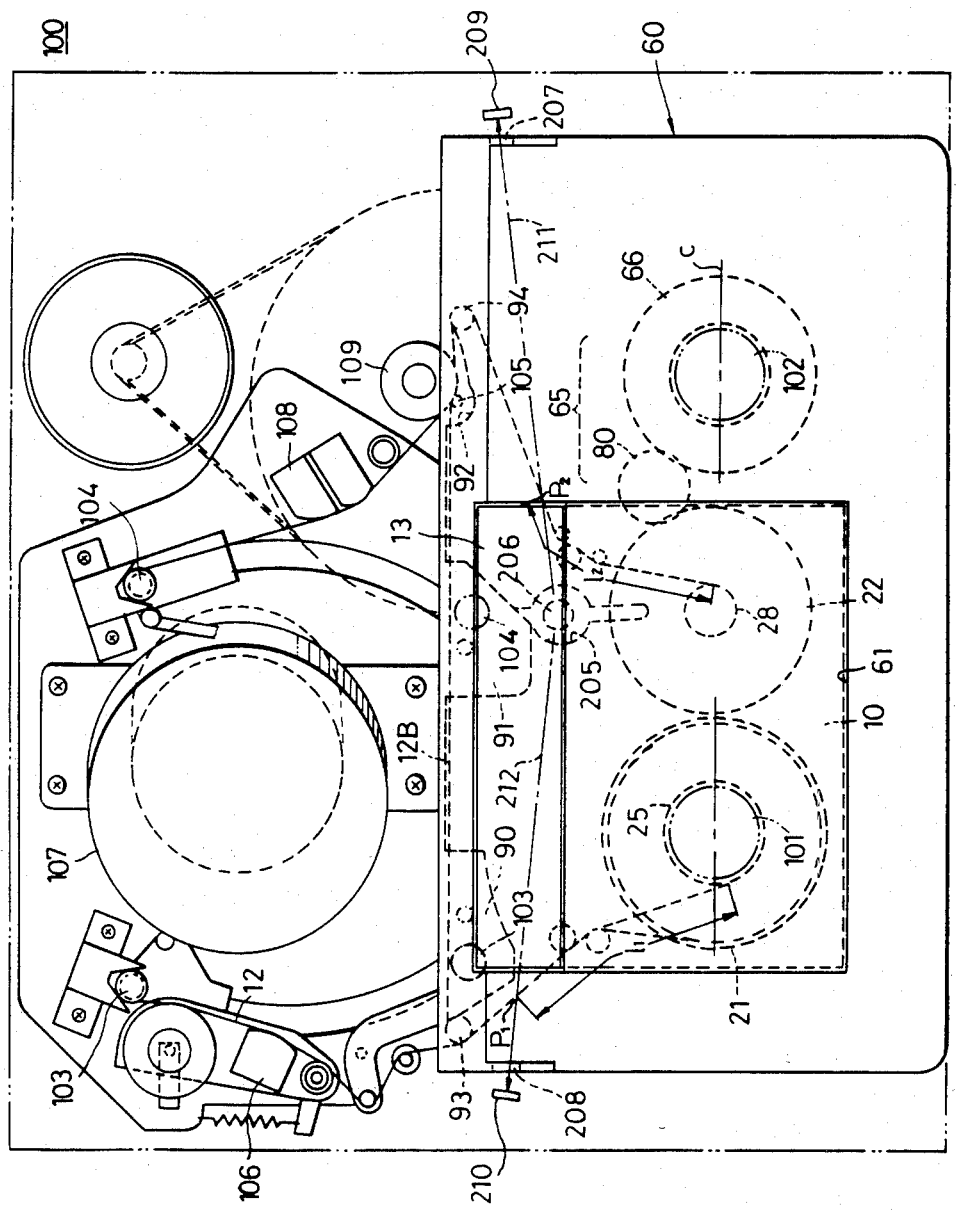
FIG. 5 is a plan view showing an example of a standard type recording and/or reproducing apparatus loaded with a tape cassette adapter which is accommodating a tape cassette, in a recording or reproducing mode.

As shown in FIG. 5, the tape cassette adapter 60 accommodating the tape cassette 10 is loaded into a standard type recording and/or reproducing apparatus 100, similarly as in the case where the standard type tape cassette is loaded.

That is, by loading the tape cassette adapter 60, a supply reel driving shaft 101 is inserted into a reel driving shaft inserting part 25a of the supply reel 21 of the tape cassette 10. On the other hand, a take-up reel driving shaft 102 is inserted into a reel driving shaft inserting part 66c of a gear structure 66 within the tape cassette adapter 60. In addition, loading poles 103 and 104 and a capstan 105 respectively enter into the cutouts 90, 91, and 92 behind the tape path 12B so as to oppose the inner side of the tape path 12B.

Upon a tape loading operation, the above loading poles 103 and 104 respectively intercept and engage with the magnetic tape 12, then draw the magnetic tape 12 out of the cassette as the loading poles 103 and 104 move away from the cutouts 90 and 91, and reach positions indicated by solid lines in FIG. 5. Accordingly, the magnetic tape 12 which is drawn outside the tape cassette adapter 60, makes contact with a full-width erasing head 106, and makes contact with a guide drum 107 provided with rotary video heads throughout a predetermined angular range. The magnetic tape 12 further makes contact with an audio and control head 108. Therefore, the above magnetic tape 12 is loaded onto a predetermined tape travelling path.

During recording and reproduction, the magnetic tape 12, is driven in a state pinched between the capstan 105 and a pinch roller 109. Moreover, the gear structure 66 within the tape cassette adapter 60 is rotated in the clockwise direction by the take-up reel driving shaft 102. This rotation of the gear structure 66 is transmitted to the take-up reel 22 through the intermediate gear 80, to drive the magnetic tape 12 towards a tape take-up direction. Accordingly, the magnetic tape 12 fed out by the capstan 105 is taken-up by the take-up reel 22. The magnetic tape 12 is guided by the guide pole 94 within the tape cassette adapter 60.

Next, description will be given with respect to a case where the tape cassette 10 is loaded into a compact type recording and/or reproducing apparatus, by referring to FIG. 6.

Figure 6:
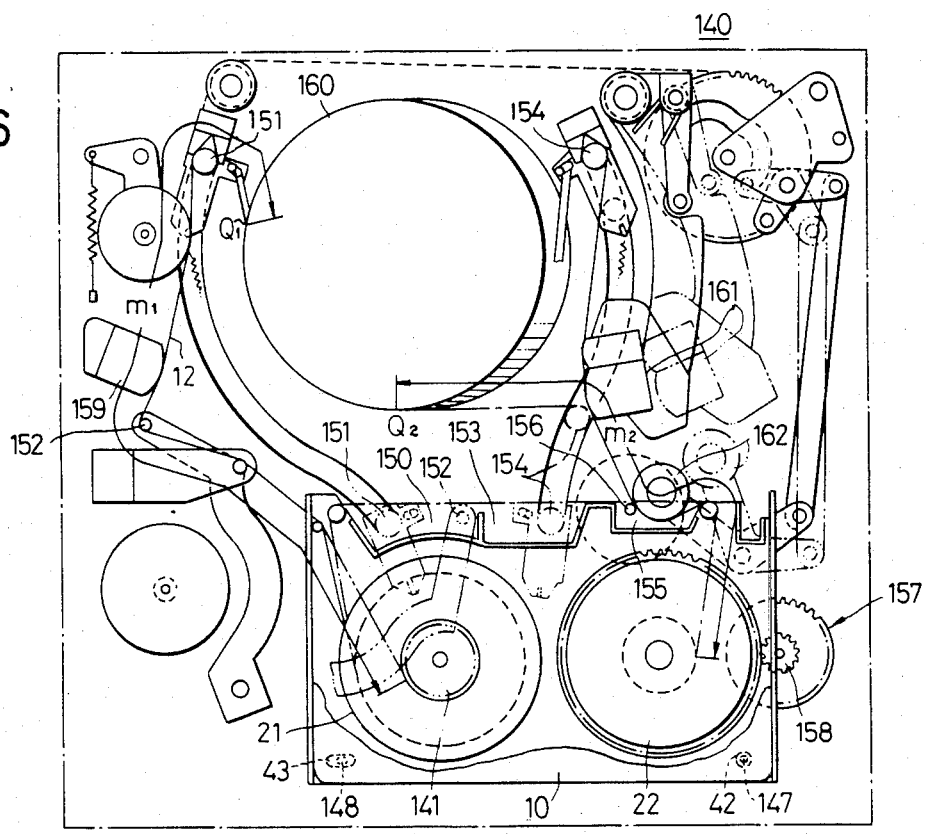
FIG. 6 is a plan view showing an example of a compact type recording and/or reproducing apparatus loaded with the tape cassette shown in FIG. 1, in a recording or reproducing mode.

FIG. 6 shows a compact type recording and/or reproducing apparatus 140. This compact type recording and/or reproducing apparatus 140 is of a smaller size, that is, the width and depth of the compact type recording and/or reproducing apparatus 140 are smaller than those of the standard type recording and/or reproducing apparatus 100 shown in FIG. 5.

A supply reel driving shaft 141 is provided at a cassette loading part of the above compact type recording and/or reproducing apparatus 140, however, a take-up reel driving shaft is not provided. The tape cassette 10 is inserted within a cassette housing having a pop-up mechanism, and then loaded into the cassette loading part by being lowered together with the cassette housing.

When the cassette housing is pushed downwards, the tape cassette 10 is accordingly lowered, and the tape cassette 10 is loaded within the loading part in a state where the central part of the supply reel 21 is inserted with the supply reel driving shaft 141. Moreover, depressed step parts 57 and 58 provided at the bottom of the tape cassette 10 respectively engage with projecting step parts (not shown) provided at the loading part. Further, the tape cassette 10 is positioned by fitting a hole 42 and a longitudinal hole 43 over positioning pins 147 and 148 provided within the apparatus.

During the loading of the above tape cassette 10, a loading pole 151 and a tension pole 152 relatively enter within the cutout 150, while a loading pole 154 and a capstan 156 respectively and relatively enter into cutouts 153 and 155. Furthermore, the lid 13 makes contact with a lid opening projection (not shown) provided in the apparatus, and is relatively opened. In addition, a gear 158 which constitutes a rotation transmitting mechanism 157 on the recording and/or reproducing apparatus, meshes with the teeth on the outer periphery of the lower flange of the take-up reel 22.

When the operational mode of the recording and/or reproducing apparatus 140 is set to a play mode, the above poles 151, 152, and 154 intercept and engage with the magnetic tape 12 to draw out the magnetic tape 12, and respectively move to positions indicated by solid lines in FIG. 6. Hence, the magnetic tape 12 is drawn out of the tape cassette 10, to make contact with full-width erasing head 159. The magnetic tape 12 further makes contact with a guide drum 160, which is provided with rotary video heads, throughout a predetermined angular range, and also makes contact with an audio and control head 161. Thus, the magnetic tape 12 is loaded onto a predetermined tape travelling path. During recording and reproduction, the magnetic tape 12 is driven in a state pinched between the capstan 156 and a pinch roller 162. Moreover, the gear 158 which is rotated by a reel driving motor (not shown) meshes with the gear teeth 27a of the take-up reel 22, and the take-up reel 22 is accordingly driven towards a tape take-up direction.

The full-width erasing head 159, the audio control head 161, and the guide drum 160 are constructed under a substantially the same standard as the corresponding heads 106 and 108 and the guide drum 107 of the standard type recording and/or reproducing apparatus 100. Accordingly, a signal is recorded onto and reproduced from the magnetic tape 12 with a tape pattern and format identical to those of the standard type recording and/or reproducing apparatus.

Next, description will be given with respect to the construction of the tape within the tape cassette 10, by referring to FIG. 7.

Figure 7:
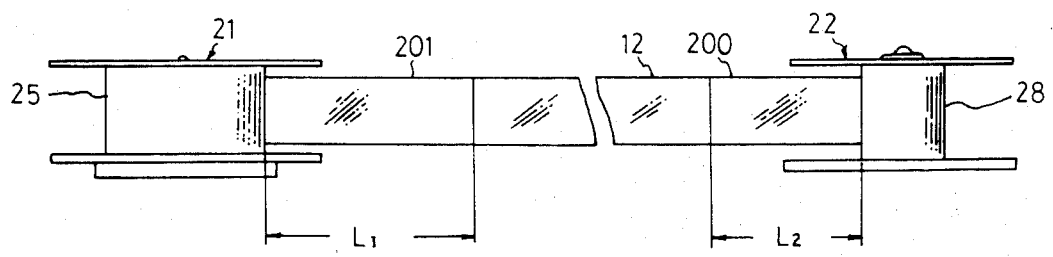
FIG. 7 is an elevation, with a part cut away, showing the construction of a tape which is wound and accommodated within the tape cassette shown in FIG. 1.

As shown in FIG. 7, a transparent leader tape 200 having a length L2 is connected to the right end of the magnetic tape 12, and a transparent trailer tape 201 having a length L1 is connected to the left end of the magnetic tape 12. The free end of the leader tape 200 is secured to the reel hub 28 of the take-up reel 22. On the other hand, the free end of the trailer tape 201 is secured to the reel hub 25 of the supply reel 21. The lengths L2 and L1 of the leader and trailer tapes 200 and 201 are respectively determined by considering the case where the tape cassette 10 is accommodated within the tape cassette adapter 60 and used with respect to the standard type recording and/or reproducing apparatus 100, and the case where the tape cassette 10 is independently used with respect to the compact type recording and/or reproducing apparatus 140.

In the standard type recording and/or reproducing apparatus 100, a light-emitting element such as a lamp 206 is provided. This lamp 206 relatively enters within a lamp inserting hole 205 provided at the center with respect to a direction along the front face of the tape cassette adapter 60, upon loading of the tape cassette adapter 60 into the standard type recording and/or reproducing apparatus 100. In addition, a start sensor 209 and an end sensor 210 respectively comprising a photosensitive element, are provided in the apparatus 100 at positions opposing side windows 207 and 208 of the loaded tape cassette adapter 60. The start sensor 209 receives the light emitted from the lamp 206 and obtained through the side window 207 (the optical axis of this light is indicated by a reference numeral 211), to detect the leader tape 200. On the other hand, the end sensor 210 receives the light emitted from the lamp 206 and obtained through the other side window 208 (the optical axis of this light is indicated by a reference numeral 212), to detect the trailer tape 201. The combination between the lamp 206 and the end sensor 210, and the same lamp 206 and the start sensor 209, construct optical tape end detection means.

In relation with the above optical tape end detection means, it will be sufficient if the trailer tape 201 has a length (l1+α), where l1 is the length of tape drawn out from the supply reel hub 25 to an intersecting point P1 between the optical axis 212, and α is an excess length. The excess length α is provided so that unnecessary tension is not introduced in the tape from the time the tape end is detected and the time the supply reel 21 actually stops rotating due to momentum. Similarly, with respect to the leader tape 200, it will be sufficient to set the length of the leader tape 200 to (l2+α), where l2 is the length of tape drawn out from the take-up reel hub 28, and α is the excess length.

The above lamp 206 is positioned substantially in the middle of the reel driving shafts 101 and 102 within the tape cassette adapter 60. Because the take-up reel 22 is driven by the gear structure 66 which is fit over the take-up reel driving shaft 102, through the intermediate gear 80, the tape cassette 10 is accommodated within the tape cassette adapter 60 at a position shifted leftwards from the center of the adapter 60. Hence, the positional relationship between the tape cassette 10 and the lamp 206 is such that the lamp 206 opposes the tape cassette 10 at a position shifted towards the take-up reel 22 from the center part of the tape cassette 10. On the other hand, the optical axes 211 and 212 are inclined away from the tape cassette 10 with respect to an imaginary line c passing through the centers of the reel driving shafts 101 and 102, by the same angle from the lamp 206. The magnetic tape 12 forms the tape path 12B extending from the front of the tape cassette 10 at both ends thereof, in a substantially symmetrical manner with respect to the right and left sides of the tape cassette 10.

Accordingly, the above intersecting point P1 is away from the left end at the front of the tape cassette 10, while the intersecting point P2 is close to the right end at the front of the tape cassette 10. Thus, a relation l1>l2 exists between the lengths l1 and l2.

Therefore, the length L2 of the leader tape 200 is shorter than the length L1 of the trailer tape 201 by a length (l1−l2). Here, if the lengths of the leader and trailer tapes 200 and 201 are to be unified, the lengths of the leader and trailer tapes must be selected to the length of the trailer tape 201 which is longer. On the other hand, the quantity or length of the entire tape including the leader and trailer tapes, is determined by the size of the tape cassette 10. Hence, if the lengths of the leader and trailer tapes are selected as described above instead of unifying the lengths, the length of the magnetic tape can be lengthened by a length corresponding to the difference in the lengths of the leader tape 200 and the trailer tape 201. This contributes to an increase in the quantity of magnetic tape 12 which can be accommodated within the tape cassette 10, and accordingly extends the recording and reproducing time of the tape cassette 10.

However, the optical tape end detection means is not provided in the compact type recording and/or reproducing apparatus 140 shown in FIG. 6. Thus, if all the tape 12 in the tape cassette 10 used is wound around the supply reel 21, for example, the leader tape 200 is also drawn out of the tape cassette 10 as the tape 12 is drawn out from the supply reel 21 during the tape loading operation. Further, the tape may travel up to the so-called tape end, in which case the trailer tape 201 connected to the tape 12 is drawn out up to the terminal end. Accordingly, the lengths of the leader and trailer tapes 200 and 201 are determined so that no inconveniences are introduced even when these leader and trailer tapes are drawn out up to the terminal end. That is, the length L2 of the leader tape 200 is selected to a length shorter than a length m2 of the tape path from the take-up reel 22 to a position Q2 where the tape first makes contact with the peripheral surface of the guide drum 160 after being drawn out of the tape cassette 10 by the pole 154. On the other hand, the length L1 of the trailer tape 201 is selected to a length shorter than a length m1 of the tape path from the supply reel 21 to a position Q1 where the tape makes contact with the peripheral surface of the guide drum 160 after being drawn out of the tape cassette 10 by the pole 152, making contact with the erasing head 159, and being guided by the pole 151.

Hence, even if the leader and trailer tapes 200 and 201 are drawn out up to the terminal ends thereof, the joints between these leader and trailer tapes 200 and 201 and the magnetic tape 12 do not reach the positions Q2 and Q1 where the tape makes contact with the guide drum 160. This prevents the video heads from being damaged by the contact between the joint in the magnetic tape 12.

In actual use, the length L2 of the leader tape 200 is selected to 80 mm, while the length L1 of the trailer tape 201 is selected to 110 mm. Thus, compared to the case where the lengths of the leader and trailer tapes 200 and 201 are unified to the length of the leader tape 200, the length of the magnetic tape 12 can be lengthened by 30 mm.

Further, the present invention is not limited to these embodiments, but various variations and modifications may be made without departing from the scope of the present invention.

What is claimed is:

1. In a miniature type tape cassette comprising a cassette case smaller than a standard type tape cassette, a magnetic tape accommodated within said cassette case, a transparent leader tape having one end secured to a take-up reel and the other end connected to a starting end of said magnetic tape, and a transparent trailer tape having one end secured to a supply reel and the other end connected to a terminal end of said magnetic tape, said transparent leader tape and trailer tape being accommodated within said cassette case, said miniature type tape cassette being loaded together with a tape cassette adapter having an external form and size identical to said standard type tape cassette with respect to a standard type recording and/or reproducing apparatus for performing recording and/or reproduction when loaded with said standard type tape cassette in a state accommodated within said type cassette adapter and forming a predetermined tape path with said tape drawn out from said cassette case, said standard type recording and/or reproducing apparatus comprising optical tape end detection means for detecting the transparent tape, said miniature type tape cassette being loaded independently with respect to a compact type recording and/or reproducing apparatus of a type different from said standard type recording and/or reproducing apparatus, wherein: said optical tape end detection means detects the tape ends at two detecting positions, a first tape length between the supply reel and one detecting position being different from a second tape length between the take-up reel and the other detecting position, and said transparent leader tape and said transparent trailer tape have mutually different lengths respectively longer than said first and second tape lengths so that said optical tape end detection means can perform the detection, in a state where said miniature type tape cassette is accommodated within said tape cassette adapter and loaded into said standard type recording and reproducing apparatus together with said tape cassette adapter, the difference in lengths between said transparent leader tape and said transparent trailer tape corresponding to the difference between said first and second tape lengths.

2. A miniature type tape cassette as claimed in claim 1 in which said miniature type tape cassette is accommodated within an accommodating part arranged at a position shifted towards the left from the center of said tape cassette adapter, and said transparent leader tape has a length shorter than a length of said transparent trailer tape.

3. A miniature type tape cassette as claimed in claim 1 in which the lengths of said transparent leader tape and said transparent trailer tape are determined so that joints between said magnetic tape do not reach a guide drum of said compact type recording and/or reproducing apparatus in a state where said miniature type cassette is loaded with respect to said compact type recording and/or reproducing apparatus and said transparent leader tape and said transparent trailer tape are drawn outside said miniature type tape cassette.

4. A miniature type tape cassette as claimed in claim 1 in which the length of said transparent leader tape is selected to 80 milimeters, and the length of said transparent trailer tape is selected to 110 milimeters.

* * * * *